United States Patent [19]
Baibak et al.

[11] Patent Number: 5,742,984
[45] Date of Patent: Apr. 28, 1998

[54] STRAP TENSIONING APPARATUS

[75] Inventors: Daniel Lee Baibak, Howell; George Nicholas Villec, Ann Arbor, both of Mich.

[73] Assignee: Ford Global Technologies, Inc., Dearborn, Mich.

[21] Appl. No.: 726,716

[22] Filed: Oct. 7, 1996

[51] Int. Cl.⁶ .................................................. F16L 33/02
[52] U.S. Cl. ................................................ 24/20 S
[58] Field of Search ........................ 267/69; 24/20 R, 24/20 S, 274 R, 20 CW, 20 TT, 20 LS, 71.1, 129 R, 129 B

[56] References Cited

U.S. PATENT DOCUMENTS

| Re. 33,639 | 7/1991 | Oetiker . | |
|---|---|---|---|
| 230,554 | 7/1880 | King .................................... | 267/269 X |
| 3,305,903 | 2/1967 | McMahon . | |
| 3,426,401 | 2/1969 | Denyes . | |
| 3,477,106 | 11/1969 | Tetzlaff et al. . | |
| 4,308,648 | 1/1982 | Fay . | |
| 4,312,101 | 1/1982 | Oetiker . | |
| 4,315,348 | 2/1982 | Oetiker . | |
| 5,115,541 | 5/1992 | Stichel ................................. | 24/20 S X |
| 5,309,607 | 5/1994 | Hohmann et al. ............... | 24/20 CW X |

FOREIGN PATENT DOCUMENTS

| 783296 | 4/1968 | Canada . | |
|---|---|---|---|
| 2450369 | 2/1980 | France . | |
| 255189 | 10/1927 | Italy .................................... | 267/69 |
| 745123 | 12/1952 | United Kingdom . | |
| 857404 | 4/1958 | United Kingdom . | |

*Primary Examiner*—James R. Brittain
*Attorney, Agent, or Firm*—Gregory P. Brown

[57] ABSTRACT

A strap tensioning apparatus (26) suitable for use in a motor vehicle having strap (11) for retaining a sensor (12) strapped inside a tire/wheel assembly (14) is described. The strap tensioning apparatus includes an arcuate member (28) having a first radius of curvature along a longitudinal axis unequal to the installed radius of curvature. The difference in radii of curvature is such that the arcuate member will maintain a predetermined tension in the strap (11) in the event the strap relaxes during normal use, thus preventing the dislocation of the strap (11) and sensor (16) relative to an installed location.

4 Claims, 2 Drawing Sheets

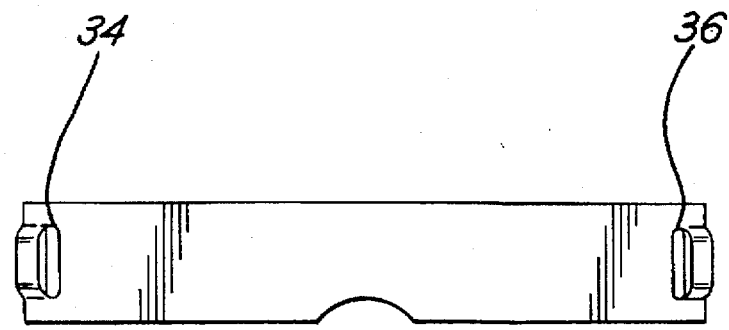
FIG. 3
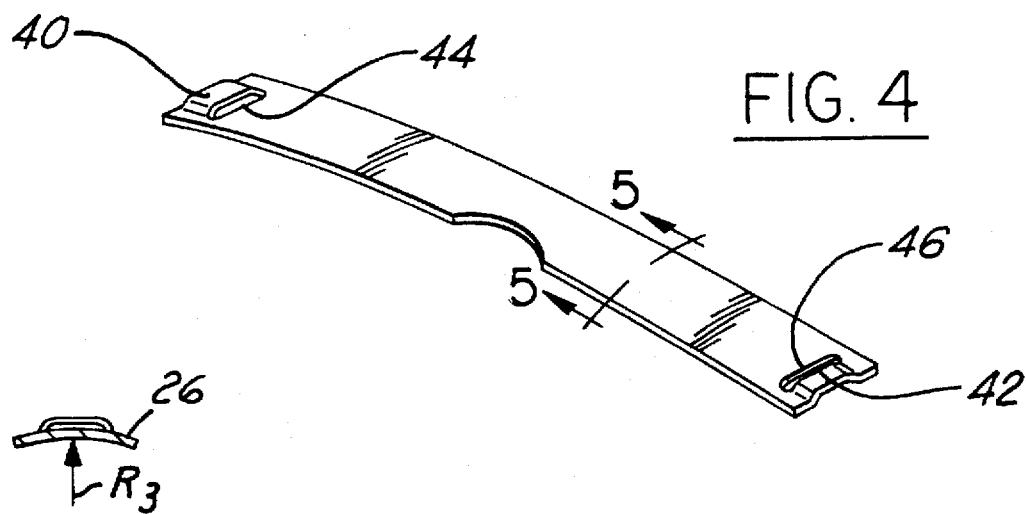
FIG. 4
FIG. 5
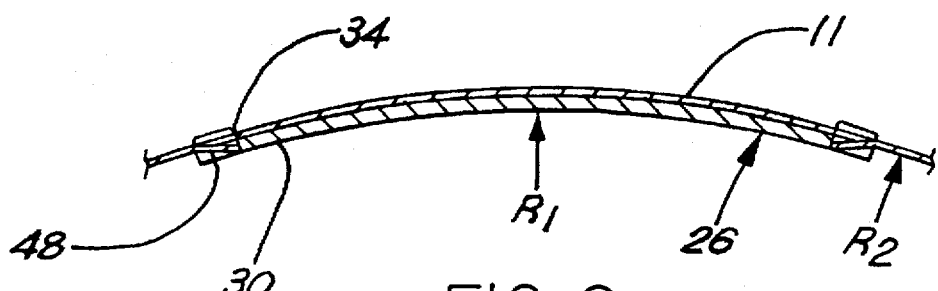
FIG. 6

STRAP TENSIONING APPARATUS

BACKGROUND OF THE INVENTION

1. Field of the Invention

This invention relates generally to a strap used to apply a circumferential clamping force to an object. More particularly, the present invention relates to a strap tensioning apparatus capable of maintaining a minimum clamping force in the event that components of the strap relax.

2. Disclosure Information

Straps used for applying a clamping force are well known in the motor vehicle industry. One popular example of such a strap is a traditional hose clamp.

Recently, it has been determined useful to use a similar strap for clamping an electronic sensor to a wheel inside of the tire mounted on the wheel. Under use, the dynamic loading imparted on the strap and sensor, differential thermal expansion between the wheel and the strap and variations in installation of the strap installation could cause the strap assembly to relax, thereby allowing the strap and sensor to move within the wheel and tire assembly. The sensor would eventually be sufficiently displaced from its originally installed location to cause a noticeable imbalance in the tire and wheel assembly.

It would be desirable to provide a strap tensioning apparatus capable of maintaining predetermined minimum tension on the strap when the strap is subject to relaxation. Specifically, it would be desirable to provide such an apparatus to maintain sufficient tension on a sensor retaining strap so as to prevent dislocation of the sensor from its originally installed location.

SUMMARY OF THE INVENTION

According to the present invention, a strap tensioning apparatus is disclosed for use with a retaining strap having an installed radius. The strap tensioning apparatus includes an arcuate member having a first radius of curvature along a longitudinal axis unequal, in an unloaded state, to the installed radius of curvature of the installed strap. The difference in the radius of the arcuate member and the installed radius of curvature of the strap is sufficient to create a predetermined minimum tension in the strap in the event the strap relaxes after installation.

An advantage of this strap tensioning apparatus is to provide a solution to strap relaxation which can cause the strap to move from its installed position. An additional advantage of the present invention is that the tensioning apparatus can be formed from the same piece of material used to form the counter balance weight for a sensor installed on the inside of a motor vehicle wheel.

BRIEF DESCRIPTION OF THE DRAWINGS

FIG. 3 is a top view of the strap tensioning apparatus in accordance with the present invention.

FIG. 4 is a perspective view of the strap tensioning apparatus in accordance with the present invention.

FIG. 5 is a sectional view taken along line 5—5 of FIG. 4, illustrating a third radius of curvature transverse to the longitudinal axis in accordance with the present invention FIG. 6 is a side elevation of an installed and loaded strap tensioning apparatus in accordance with the present invention.

DETAILED DESCRIPTION OF THE PREFERRED EMBODIMENT

Figure 1:
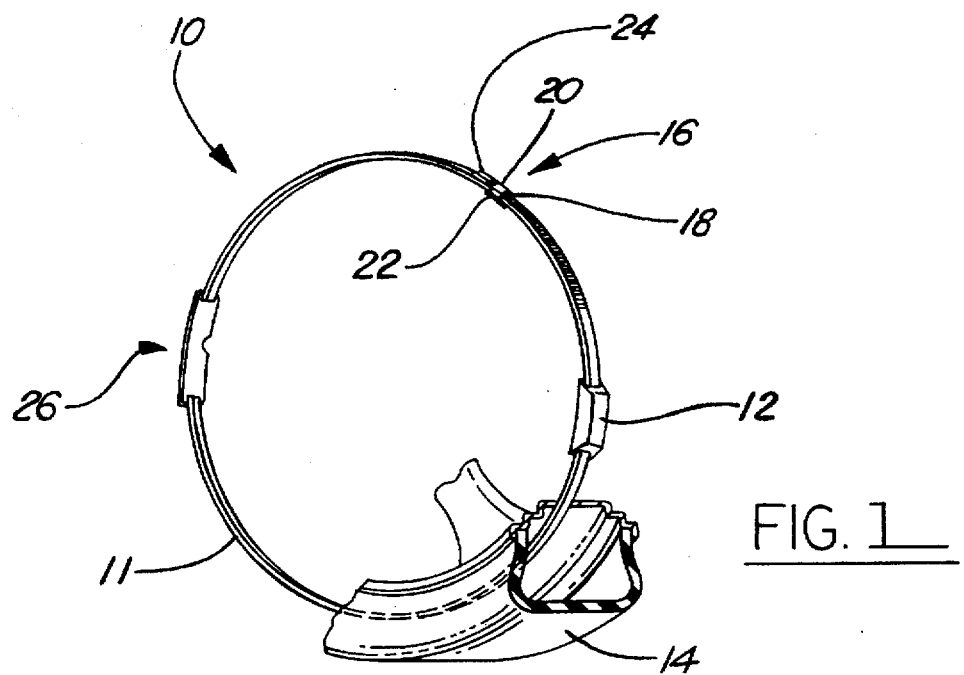
FIG. 1 is a perspective, partially sectioned view of a strap tensioning apparatus as installed on a retaining strap used to clamp a sensor to a wheel of a motor vehicle in accordance with the present invention.

Referring now to FIG. 1, a retaining strap 10 is shown retaining a sensor 12 on a wheel assembly 14 as used on a motor vehicle. The retaining strap 10 includes a strap 11 and a conventional pulling or tightening device 16 which generally comprises a threaded screw 18 mounted within a collar 20 securely fastened to one end 22 of the strap 11. The collar 20 urges the threads of the threaded screw into engagement with slots (not shown) located on a second end 24 of the strap 11. Many other pulling devices may be used in place of the illustrated device, such as a hook and lever, with equivalent operability and functionality. A spring tensioning device 26 may be located anywhere on the strap to provide its primary tensioning function, however, when doubling as a counter weight, it generally will be located at a predetermined location.

Figure 2A:
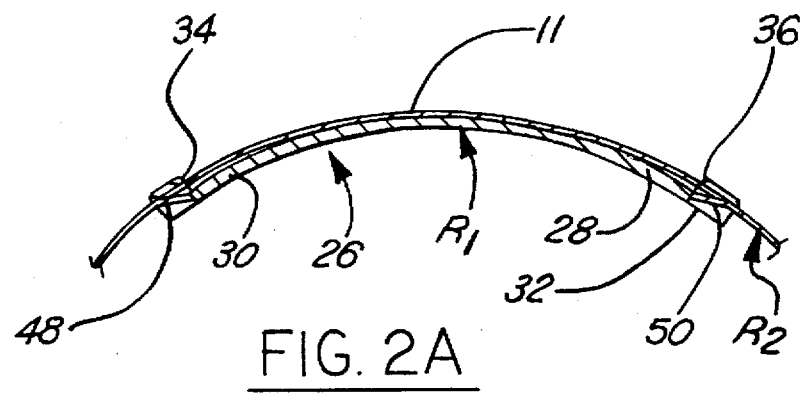
FIG. 2A is a side elevation of the strap tensioning apparatus in accordance with the present invention.

Referring now to FIG. 2A, the spring tensioning device 26 includes a generally arcuate member 28 having a first end 30 and a second end 32 located opposite therefrom along a longitudinal axis. The longitudinal axis further defines a first radius of curvature, indicated as R1. The first radius of curvature, when unloaded, or uninstalled, is unequal to a second radius of curvature, indicated by R2, of the strap 11 as installed. The illustrated first radius of curvature R1 is less than the second radius of curvature, R2, of the installed strap. The degree of difference between the first and second radius of curvatures determines the amount of relaxation the spring tensioning device can accommodate. It should be noted that in the presently preferred embodiment, the second radius of curvature, R2, of the installed strap is equal to the outer diameter of the wheel. The present invention is not so limited, as it would provide equivalent operability and functionality on a non-circular objects to be clampled.

Figure 2B:
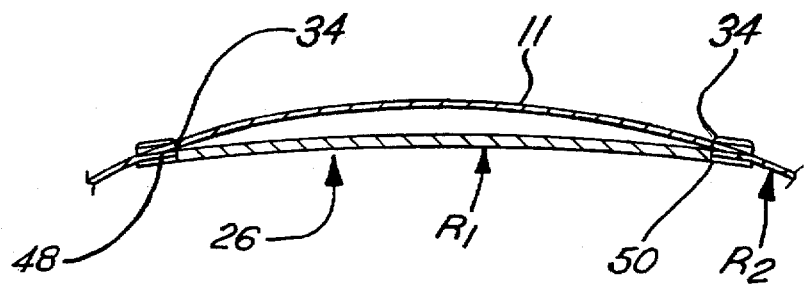
FIG. 2B is a side elevation of an alternative embodiment of the strap tensioning apparatus in accordance with the present invention.

Referring to FIG. 2B, an embodiment is shown having the spring tensioning device 26 with a first radius of curvature R1' is greater than that of strap 11. This clearly demonstrates the principle that the arcuate member 28 have a radius of curvature unequal to the installed radius of the strap, R2, either larger or smaller.

Referring now to FIGS. 3 and 4, the spring tensioning device also includes a device for retaining the arcuate member 28 on the strap. In the presently preferred embodiment, first and second apertures 34, 36, are located at the first and second ends 30, 32, respectively. Material of the arcuate member 28 adjacent to the outer edges of the first and second apertures 34, 36 are pushed upward to form arches 40, 42 for the strap 11 to pass under. Additionally, the inner edges 44, 46 of the first and second apertures 34, 36 may provide additional location control relative to the strap by engaging first and second protuberances 48, 50 projecting radially inward from the strap to engage the inner edges 44, 46 on the arcuate member 28. The protuberances 48, 50 are formed with a slope so as to allow the arcuate member to slide over them and into predetermined location for counter balance purposes.

It has also been noticed that additional retention and spring force can be generated by an arcuate member 28 if it is formed having a third radius of curvature along a transverse axis, as can be seen in FIG. 5.

The spring tensioning device can be made from any suitable material capable of sustaining repeated dynamic loading while retaining its stiffness properties. One such material that has been determined satisfactory for fulfilling this as well as providing mass for counterbalancing purposes has been common spring steel, such as SAE 1050 heat treated.

Referring now to FIGS. 1, 2 and 6, during installation, the strap 11 is fed through the arches 40, 42 to a predetermined location where the protuberances 48, 50 provide positive location of the arcuate member 28. The pulling device 16 draws the strap 11 into a predetermined tension around the object to be clamped, such as the wheel. This compresses the curvature of the arcuate member to compress against the installed curvature of the strap. If the unloaded arcuate member's radius of curvature is greater than the installed straps radius of curvature, then installation would compress the arcuate member to have a smaller radius of curvature, with a restoring force existing to return to the larger radius of curvature. After time, especially if subjected to dynamic impact loading and thermal cycling, the tension in the strap may relax, however, the arcuate member will take up slack in the strap within a predetermined range to maintain sufficient tension in the strap, such as to prevent it from moving.

The foregoing description presents two embodiments of the present invention. Details of construction have been shown and described for purposes of illustration rather than limitation. It should be obvious to those skilled in the art that the thickness, length and width of the arcuate member may be varied to provide different ranges of spring loading as well as counter balance weight. Modifications and alterations of the invention will no doubt occur to those skilled in the art that will come within the scope and spirit of the following claims.

What is claimed:

1. A strap tensioning apparatus comprising;
   a tension strap having a first end and a second end opposite therefrom;
   means for pulling said first end of said tension strap relative to said second end of said tension strap so as to apply a tension on said strap sufficient for said strap to attain a predetermined installed radius; and
   an arcuate member having a first radius of curvature along a longitudinal axis unequal in an unloaded state than the installed radius of curvature of the installed strap;
   first and second apertures disposed at opposite ends of said arcuate member, said first and second apertures being adapted to receive said strap therethrough; and
   first and second protuberances protecting from said strap so as to engage first and second edges disposed at opposite ends of said arcuate member, said protuberances being adapted to retain said arcuate member in a predetermined position on said tension strap.

2. A strap tensioning apparatus according to claim 1, wherein said arcuate member further includes a predetermined second radius of curvature along a transverse axis.

3. A strap tensioning apparatus according to claim 1, wherein said arcuate member is stamped from spring steel.

4. A strap tensioning apparatus for use with a retaining strap having an installed radius, said strap tensioning apparatus comprising:
   an arcuate member having a first radius of curvature along a longitudinal axis which, in an unloaded state, is unequal to the installed radius of curvature of the installed strap and a predetermined second radius of curvature along a transverse axis.

* * * * *